US 8,096,764 B2

(12) United States Patent
Steffensen

(10) Patent No.: US 8,096,764 B2
(45) Date of Patent: Jan. 17, 2012

(54) SYSTEM FOR ROTATING A WIND TURBINE BLADE

(75) Inventor: Ulrik Steffensen, Zanudio (ES)

(73) Assignee: Gamesa Innovation & Technology, S.L., Sarriguren (ES)

( * ) Notice: Subject to any disclaimer, the term of this patent is extended or adjusted under 35 U.S.C. 154(b) by 473 days.

(21) Appl. No.: 12/444,439

(22) PCT Filed: Oct. 9, 2007

(86) PCT No.: PCT/ES2007/070173
§ 371 (c)(1),
(2), (4) Date: Apr. 6, 2009

(87) PCT Pub. No.: WO2008/043875
PCT Pub. Date: Apr. 17, 2008

(65) Prior Publication Data
US 2010/0014972 A1 Jan. 21, 2010

(30) Foreign Application Priority Data
Oct. 11, 2006 (ES) .................................. 200602592

(51) Int. Cl.
*B63H 3/10* (2006.01)
*B64C 11/30* (2006.01)
*F01D 7/00* (2006.01)
(52) U.S. Cl. ................ 416/26; 416/1; 416/31; 416/155; 290/44; 290/55
(58) Field of Classification Search ................ 416/1, 23, 416/26, 31, 37, 46, 48, 155; 290/42–44, 290/55
See application file for complete search history.

(56) References Cited

U.S. PATENT DOCUMENTS

| | | | | |
|---|---|---|---|---|
| 4,490,093 A * | 12/1984 | Chertok et al. | ................. | 416/26 |
| 4,792,281 A | 12/1988 | Coleman | | |
| 7,126,236 B2 * | 10/2006 | Harbourt et al. | ................ | 290/44 |
| 7,218,012 B1 * | 5/2007 | Edenfeld | ......................... | 290/44 |
| 7,569,944 B2 * | 8/2009 | Oohara et al. | .................. | 290/44 |
| 7,719,128 B2 * | 5/2010 | Kammer et al. | ................ | 290/44 |
| 7,914,411 B2 * | 3/2011 | Basteck | ......................... | 475/35 |
| 7,944,067 B2 * | 5/2011 | Kammer et al. | ................ | 290/44 |
| 7,956,482 B2 * | 6/2011 | Nies et al. | ....................... | 290/55 |

FOREIGN PATENT DOCUMENTS

| | | |
|---|---|---|
| ES | 8207282 | 12/1982 |
| GB | 1374756 | 11/1974 |
| WO | 2006/007838 | 1/2006 |

* cited by examiner

*Primary Examiner* — Chris Chu
(74) *Attorney, Agent, or Firm* — Ladas & Parry LLP

(57) ABSTRACT

A system for driving a wind turbine blade (46) into a feathered position during an emergency stopping process of a wind turbine rotor. The system comprises a hydraulic actuator (3) functionally connected to the blade (46) for changing the pitch of the blade (46) during movement of the hydraulic actuator (3) and an emergency accumulator (8) connected to the hydraulic actuator (3) for driving the hydraulic actuator (3) with fluid from the emergency accumulator (8). The emergency accumulator (8) comprises a resilient member for accumulating the fluid in the emergency accumulator (8) under resilient pressure or a weight member (74) comprising a weight member upon the fluid in the emergency accumulator. The resilient member (14) or weight member (74) is configured for driving the fluid out of the emergency accumulator due to the expansion or retraction of the resilient member.

15 Claims, 6 Drawing Sheets

SYSTEM FOR ROTATING A WIND TURBINE BLADE

FIELD OF THE INVENTION

The present invention relates generally to wind turbines and more specifically to a system for controlling at least one wind turbine blade pitch during a stopping process of a rotor in a wind turbine.

BACKGROUND OF THE INVENTION

With energy resources becoming gradually more limited and expensive, it makes an increasingly more attractive business case to produce wind power. Accordingly, during the recent years there has been increasing focus on alternative energy such as wind-generated electricity.

When operating a wind turbine under normal conditions, the blades can usually be pitched to feathered position during stopping of the wind turbine. This can be done in controlled manner in most cases, but during emergency stops, in case of grid drop out, failure in generator or control system, the pitching of the blades in order to achieve the emergency stop can introduce severe uncontrolled loading.

Whilst the turbine's blade pitch control system may be capable of feathering the blades, for example in case of excessive wind velocity, feather systems are provided for emergency blade feathering during failure of the blade pitch control system. A common way to achieve such feathering is to adjust the pitch angle of the blades to approximately 90 degrees, whereupon wind flow over the blades quickly reduces the rotational speed of the rotor. By this manner the torque produced by the blades and hence the rotation of the generator rotor is minimized.

Several attempts have been made to provide wind turbines with systems for feathering the turbine's blades when it is considered necessary to shut the turbine down. In order to reduce operating time at conditions of excessive wind velocity, rapid blade feathering is desirable. On the other hand, feathering at a constant, rapid rate may result in excessive blade stresses due to substantial decelerating torque and reverse thrust developed by the blades as they approach fully feathered positions. Therefore, as the blades are feathered, at the time point where the blade pitch has increased to the point where airflow over the blades no longer develops positive torque on the turbine rotor, the next thing to do would be to reduce the rate of feathering in order to reduce the decelerating torque and reverse thrust developed by the blades, and by this means minimizing blade stresses. For safety reasons, reduction in the pitch rate as a result of the blades approaching their feathered positions should not come at the expense of feathering at a maximum rate while airflow over the blades develops a positive shaft torque.

Emergency pitch systems are typically either hydraulic or electrical.

U.S. Pat. No. 4,462,753 discloses a mechanical/hydraulic pitch system with a separate emergency system for wind turbines. The blade feathering system includes a feather actuator, control means operatively connected thereto and an adjustment means operatively connected to the control means for selectively varying the rate of operation of the feather actuator for feathering the wind turbine blades at a variable rate. One drawback of this invention is a cam follower is required to operate a valve. The cam follower is expensive and troublesome to manufacture. Another drawback of this invention is that it uses a separate actuator to turn the blades during emergency stop and another actuator for normal operation. A further drawback of the disclosure is that the use of an electrically driven pump to turn the blades during emergency. In the case of power failure, this may have fatal consequences.

The emergency pitch problems have previously been solved by introducing a flow control valve in the hydraulic system that limits the pitch speed to about 10 degrees/sec. This pitch speed is a compromise that limits the rotational speed to an acceptable value in most cases. Hereby one can prevent extreme loading of the turbine. The crucial problem is that the flow control valves are inexact. This lack of accuracy involve that flow of 11 degree/sec. may occur. The load can hereby be increased significantly. Another drawback is that the pitch speed depends on the viscosity of the oil and hence the temperature of the oil.

The electrical systems work differently. When the emergency pitch is activated, there is no guarantee for electrical contact in the rest of the turbine. This may be crucial due to the fact that the control system may be out of order. Batteries or other electrical energy sources situated near by the pitch system can bring the blades to feathered position. The drawback with this method is that the generator generally provides a counter torque, however, in the case of electrical dysfunction, the counter torque will no longer be present. Accordingly, this may cause a dramatically increased angular velocity of the rotor, which can activate the speed guide and in the worse case damage components. Furthermore, the aerodynamic loading may introduce severe uncontrolled loading, because the loading, generally speaking, is proportional to the square of the velocity. On the other hand, if the pitch is too fast, the blade will experience a negative lift and, hence, the rotor will pull the turbine forward and introduce extreme load on the blades and tower.

WO 06 007 838 discloses a method of controlling at least one wind turbine blade during the stopping process of the rotor in a wind turbine system. The method optimizes the control velocity of the process in response to one or more feedback values of the system and/or one or more feedback values from the surroundings of the system by altering the angular pitch velocity from 10 degrees/sec during the initial stage of the stopping process to 5 degrees/sec at the final stage of the stopping process. A control system and a wind turbine as well as use hereof are also disclosed. One drawback of this system is the use of a turbine control system during an emergency stop. While it would be advantageous to apply a purely passive mechanical system, the disclosed system uses a turbine control system that requires electrical power with the disadvantageous risk for power failure.

DESCRIPTION OF THE INVENTION

It is an object of the present invention to provide a simple and reliable system and method for controlling a wind turbine blade pitch during an emergency stopping process of a rotor in a wind turbine without the above mentioned disadvantages. Especially, it is the purpose of the invention to provide a method and system, in which the stopping process is reliable and simple and does function also during power failure.

Other advantages of the present invention and the specific embodiments thereof will become apparent in the following disclosure of the invention.

The objects of the present invention is accomplished by a system for driving a wind turbine blade of a wind turbine rotor, the system having a first pitch driving system configured for adjusting the pitch of the blades during normal working conditions on the basis of a feedback signal from a pitch control system, wherein the system is configured to drive the blades with variable pitch velocity into a feathered position during an emergency stopping process. Furthermore, the system in addition to the first pitch driving system comprises a feedback-free, emergency pitch system for driving the blades into a feathered position.

The system according to the invention does not need a feedback control system in emergency situations and is, therefore, independent of any electrical control system. The emergency stop system does also work in case of power failure.

Preferably, the emergency pitch system is of hydraulic nature, where valves are opened or closed upon recognition of an emergency situation, for example a rotor speed above a predetermined threshold, or in case of power failure. As explained in the following, a variety of concrete embodiments are possible.

The invention is configured for variable pitch speed during emergency stopping. Especially, the pitch speed is regulated stepwise by to or more steps, the reason explained in the introduction above.

In a first embodiment, the invention comprises a system for driving a wind turbine blade into a feathered position during an emergency stopping process of a wind turbine rotor, wherein the system comprises a hydraulic actuator functionally connected to the blade for changing the pitch of the blade during movement of the hydraulic actuator and an emergency accumulator connected to the hydraulic actuator for driving the hydraulic actuator with fluid from the emergency accumulator. The emergency accumulator has stored the hydraulic fluid under pressure, which can be released during emergency stopping. Due to the storage of potential energy in the emergency accumulator, no further power, such as electrical power, is necessary for driving the feather actuator.

For example, the emergency accumulator may comprise a resilient member for accumulating the fluid in the emergency accumulator under resilient pressure, the resilient member being configured for driving the fluid out of the emergency accumulator due to the expansion or retraction of the resilient member.

Though not being a preferred solution, the emergency accumulator may as an alternative to the resilient member comprise a weight member upon the fluid in the emergency accumulator for accumulating the fluid under pressure, the weight member being configured for driving the fluid out of the emergency accumulator due to the downwards movement of the weight member.

The word resilient member as used in the present application is taken to mean any resilient member capable of being expanded or retracted. The resilient member could by way of example be a spring or pressurised gas such as air.

The present invention hereby provides an emergency pitch system that is equipped to pitch a blade a certain amount, for example 6-8 degrees, quickly in order to reduce the lift from the current blade. When pitching this amount, the lift on the blade will be significantly reduced and, accordingly, a reduced angular velocity of the rotor will be accomplished. Hereafter, the blades are pitched slowly the rest of the way to the final feathered position. When the angle of attack corresponds to the maximum negative angle of attack, the relative velocity of the blades is low and hence no severe loading will occur. In this manner the system provides a simple and reliable tool for controlling at least one wind turbine blade pitch during an emergency stopping process of a rotor in a wind turbine. The system provides a method, in which the pitch velocity is variable and independent of feedback values from the control system. Accordingly, the pitch system operates as intended even in case of grid drop out, failure in generator or control system and other situations, in which alternative systems may fail to pitch the blades and hereby introducing severe uncontrolled loading.

By having an emergency accumulator that comprises a resilient member for accumulating the fluid in the emergency accumulator under resilient pressure, the resilient member being configured for driving the fluid out of the emergency accumulator due to the expansion or retraction of the resilient member, it is possibly to have stored mechanical energy that can be used to actuate a wind turbine blade into a feathered position during an emergency stopping process. Hereby, a purely mechanical system is achieved that will function in the absence of electrical power. The system hereby provides a high degree of security.

The emergency accumulator can also comprise a weight member on top of the fluid in the emergency accumulator for accumulating the fluid under pressure. By securing that the weight member is configured for driving the fluid out of the emergency accumulator due to the downwards movement of the weight member, mechanical energy can be stored and used to drive a wind turbine blade into a feathered position.

In a particular preferred embodiment of the present invention, the system comprises a valve arrangement for activation of the release of fluid from the emergency accumulator, wherein the valve arrangement is configured to activate the release of the fluid from the emergency accumulator due to an activation signal, the activation signal indicating the speed of the turbine above a certain threshold value, wherein the activation signal is free from feedback from a control system for normal operation of the rotor. By releasing fluid from the emergency accumulator due to an activation signal indicating the speed of the turbine above a certain threshold without using any feedback from the control system, a system is achieved that can operate appropriately, even when the control system is damaged or out of order. Releasing the fluid provide for driving the hydraulic actuator. The threshold value can be predetermined according to general guidelines.

In another embodiment of the present invention, the system comprises a valve arrangement for activation of the release of fluid from the emergency accumulator, wherein the valve arrangement is configured to activate the release of the fluid from the emergency accumulator due to an activation signal, wherein the absence of electrical power to the valve arrangement is the activation signal. In this manner, it is possibly to operate the system in case of grid drop out, failure in generator or control system and other situations, in which alternative systems may fail to pitch the blades and hereby introduce severe uncontrolled loading. This mechanism is extremely important and required in many emergency situations in order to prevent vast damage.

In still another embodiment of the present invention, the valve arrangement comprises a spring loaded emergency valve between the emergency accumulator and the hydraulic actuator, wherein the emergency valve is configured to be closed under normal turbine operation due to action of hydraulic pilot fluid pressure against the spring load. Hereby is achieved that a valve system opens automatically in emergency situations due to the absence of electrical power. It is, however, also possibly to apply the control system to establish the intended opening of the emergency valve in emergency situations without absence of electrical power. In fact, a combination of both a power independent and power dependent system can be achieved with the present invention.

In a further embodiment of the present invention, the hydraulic pilot fluid pressure is controlled by a pilot valve that is preloaded by a spring, the spring action being releasable due to the activation signal. By this way it is possibly to control the pilot valve with simple means. The activation signal may be either a signal generated by a control system or a signal generated by the absence of electrical power. By closing the pilot valve by means of an electrical actuator loading the spring, the valve can be opened by unloading the spring. The process of unloading the spring can either be triggered by using an electrical actuator in the presence of electricity, or by the absence of electrical power necessary to hold the spring to keep the valve closed. In a case, in which there is no electricity available, the electrical actuator cannot hold the spring which thereby gets unloaded and initiates the driving of the turbine blade into a feathered position.

In a still further embodiment of the present invention, the system is configured for a decreasing pitch velocity during emergency stopping. In order to avoid overload of any part of the wind turbine and especially the blades, during the stopping process, the pitch velocity have to be picked conservatively. If the stopping process is too slow, the generator and gear means of the wind turbine may suffer damage. If the angular pitch velocity has a high initial value and a lower succeeding value (i.e. by initially applying a high transient acceleration from 0 to somewhere between 10 and 15 degrees/sec$^2$ in the first period) a steady-state condition in which a no-acceleration position is reached. In an emergency situation the wind turbine can be stopped by quickly pitching the wind turbine blades to a dynamically stabile condition, in which a very low force will accelerate the blades. Hereafter the blades can be brought to a full stop in a slower pace. Accordingly, it is an advantage to apply a system configured for a decreasing pitch velocity during emergency stopping.

The above fulfils the further object of the present invention to provide a system and a method in which the pitch velocity is variable, for example divided into at least two step velocities.

In another embodiment of the present invention, the system comprises a fluid connection from the emergency accumulator to one side of a piston in the hydraulic actuator, a first fluid connection from the opposite side of the piston to a first receiver accumulator for receiving hydraulic fluid with a first volume flow from the hydraulic actuator during driving a wind turbine blade into the feathered position, and a second fluid connection from the opposite side of the piston to a second receiver accumulator for receiving hydraulic fluid with a second volume flow from the hydraulic actuator during driving a wind turbine blade into the feathered position, wherein the receiving capacity of the first receiver accumulator is less than the volume capacity of the emergency accumulator for decreasing pitch velocity during filling of the second receiver accumulator after filling of the first receiver accumulator. The term "volume flow" here means the amount of fluid flowing per time unit.

Hereby is achieved a system that, by simple means, can drive a turbine blade into a feathered position at two velocities. The presence of a connection between emergency accumulator to one side of a piston in the hydraulic actuator ensures that the fluid can move the piston in the hydraulic actuator during emergency situations. The connection from the opposite side of the piston in the hydraulic actuator to the first receiver accumulator provide means for transport of hydraulic fluid from the hydraulic actuator during driving a wind turbine blade into the feathered position at a first feathering speed. Since the receiving capacity of the first receiver accumulator is less than the volume capacity of the emergency accumulator, the pitch speed will change after filling of the first receiver accumulator. This lower pitch velocity after filling of the first receiver accumulator can be controlled by controlling the flow velocity of the hydraulic fluid in the connection between the first and the second receiving accumulator.

Thus, this embodiment also fulfils the further object of the present invention to provide a system and a method in which system the pitch velocity is independent of feedback values from the control system.

In a favoured embodiment of the present invention, a flow restrictor is provided in the second flow connection for restricting the flow to the second receiver accumulator relative to the flow to the first receiver accumulator. The flow restrictor can i.e. be a nozzle or valve. By placing a nozzle or valve in the second flow connection for restricting the flow to the second receiver accumulator relative to the flow to the first receiver accumulator, it is possibly to provide a simple way to regulate the pitching velocity. The means can be purely mechanical, and hence the system can operate in the absence of electricity. If the flow restrictor is severely restricting the flow, the flow during the first step of the emergency stop will primarily fill the first receiver with only little fluid going to the second receiver. After having filled the first receiver, fluid can only be transmitted to the second receiver through the flow restrictor determining the pitch speed in the second step of the feathering.

In another particular embodiment of the present invention, the first receiver accumulator comprises a resilient member and an accumulator arrangement for accumulating the fluid in the emergency accumulator under resilient pressure, the accumulator arrangement being configured for receiving fluid under decreasing volume flow due to the expansion or retraction of the resilient member during filling of the first receiver accumulator. By using a resilient member, for example a spring, the force to fill the first receiver accumulator increases continuously during the filling of the first receiver, implying a steadily decrease in pitch speed. By using a resilient member, mechanical energy can be stored in the resilient member. Afterwards the hydraulic fluid can be fed out of the receiving accumulator by applying stored energy. The accumulator arrangement, which e.g. can be a cartridge or a cylinder, is capable of receiving a certain amount of hydraulic fluid. The resilient member can be expanded or retracted in order to provide space for the hydraulic fluid that is fed into the first accumulator. By changing the volume of the accumulator arrangement it is possibly to alter the duration of the time to fill the first accumulator and hence the duration of the first strike of the feathering process.

From the above description, it appears that the pitch speed is regulated by the volume of the first receiver and the flow restrictor to the second receiver. Furthermore, in the case of elastic members such as springs, a change of the flow during feathering is achieved due to the continuously compression of the spring in the first receiver accumulator and the continuous release of the spring in the emergency accumulator. Furthermore, additional flow restrictors may be used to exactly match the flow in this passive system with general requirements for the pitch speed in emergency situations.

An alternative system according to the invention comprises a fluid connection from the emergency accumulator to one side of a piston in the hydraulic actuator, the fluid connection comprising a first branch and a second branch, the flow restriction in the first branch being smaller than the flow restriction in the second branch for achieving an initial flow primarily in the first branch and secondarily in the second branch.

Optionally, this system may have a first branch with a piston arrangement with an inlet chamber and an outlet chamber on either side of a movable piston, wherein the inlet chamber is configured for receiving hydraulic fluid from the emergency accumulator for piston movement towards the outlet chamber, wherein the outlet chamber is configured for delivering hydraulic fluid to the hydraulic actuator by decreasing the volume of the outlet chamber by the piston movement.

In another embodiment of the present invention, the hydraulic actuator is configured for blade pitch regulation also under normal operating condition of the wind turbine blade. Hereby is provided a technically less demanding system for blade pitch regulation. In this way, the pitch system requires less space, as the normal operating system and the emergency system can make use of the same hydraulic fluid lines. This fulfils an even further object of the present invention to provide a system and a method where the same mechanism is used to turn the blades during emergency stop as well as for normal operation.

In another embodiment of the present invention, the system comprises a proportional valve for driving the hydraulic actuator during normal condition, wherein the system comprises valves configured to hydraulically bypass the proportional valve under emergency conditions. By using a proportional valve, it is possibly to drive the hydraulic actuator during normal condition. The pitching process can be accomplished by using minor adjustments. This is extremely important during normal operation. Accordingly, the combination of an "emergency pitching system" and a "normal condition pitching system" is an optimal solution.

In a favoured embodiment of the present invention, the flow control involves two valve emergency circuits. One valve opens for the high speed and the other takes over after a short time period (i.e. few seconds). In the latter situation the speed is reduced.

According to the above, it is possible to apply more than two speeds for controlling a wind turbine blade pitch during a stopping process, for example a continuously changing pitch speed, or a pitch speed change in more than two steps. Hereby is obtained greater freedom to choose the duration and configuration of the pitching.

The invention is not limited to the described embodiments which can be modified in many ways. This applies in particular to the shape and the materials of the ear tags, the punch rod, the lever and the cross-sections profiles of the base section and a support section of the frame.

Furthermore, the two-step or multi-step pitch of the blades may, alternatively, be achieved by employing loaded springs with successive release of the spring loading directly for driving the blade pitch.

An even further embodiment comprises electrical accumulators that are activated for release of electricity in a stepwise manner, for example governed by interconnected capacitors such that the passively, stepwise regulated current drives a motor for the pitch regulation at stepwise varied speed.

DESCRIPTION OF THE DRAWINGS

The invention will be explained in more detail in the following with reference to the drawings, where.

DETAILED DESCRIPTION OF THE INVENTION

Figure 1:
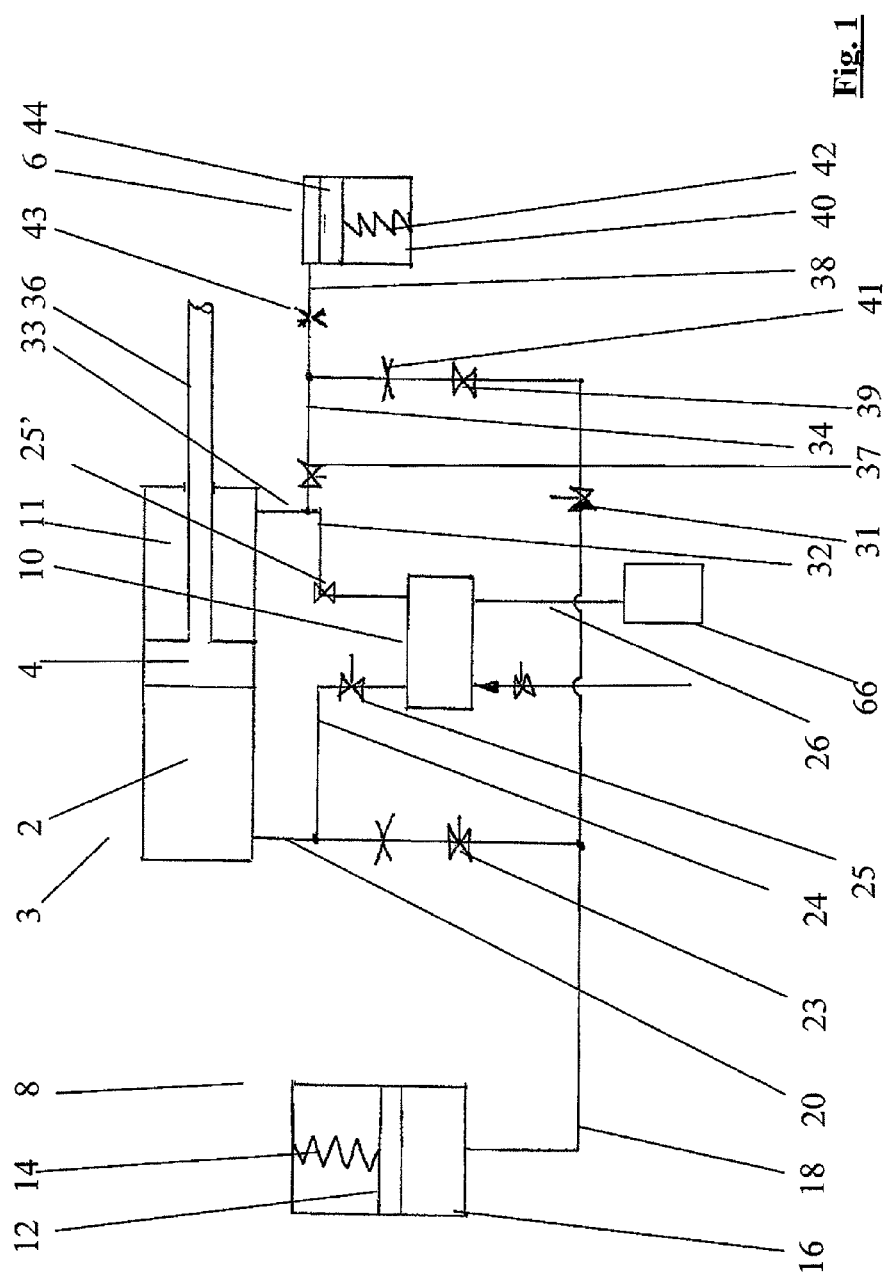
FIG. 1 shows a block diagram of the an embodiment of the present invention with a spring loaded emergency accumulator.
Figure 2:
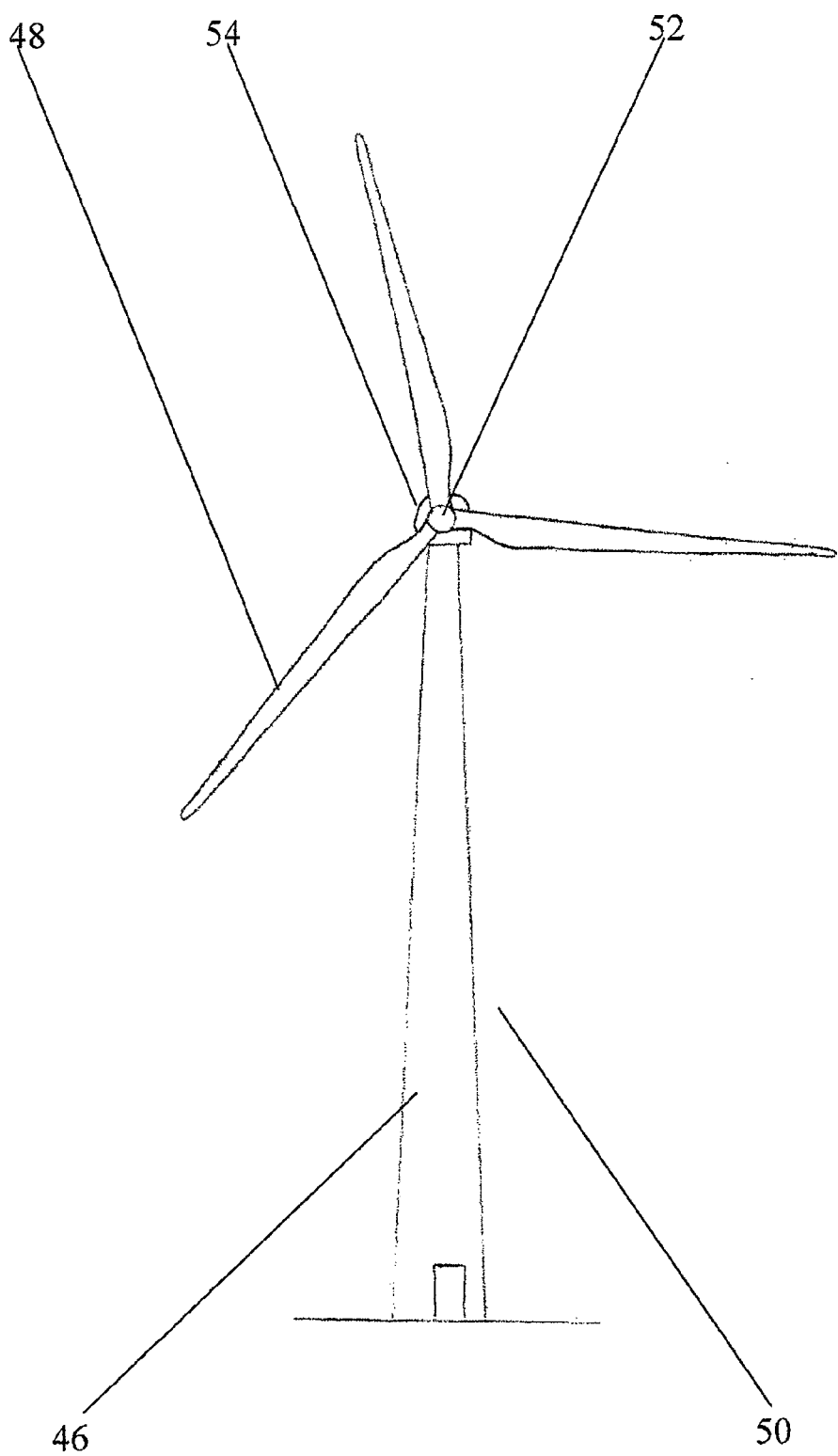
FIG. 2 shows a large wind turbine with three wind turbine blades in the wind turbine rotor.

FIG. 1 shows a block diagram of the hydraulic circuit in a mechanical stop situation in an embodiment of a wind turbine blade pitch change and feather actuation system according to the present invention. A piston 4 is adapted to move inside a wind turbine blade pitch cylinder 3 in the presence of hydraulic fluid 2, 11. The piston 4 is connected to a wind turbine blade as shown in FIG. 2 via an arm 36. The emergency accumulator 8 comprises a spring 14 and piston 12 surrounded by a cylinder 16 that contains hydraulic fluid. The emergency accumulator 8 can be drained through a drain line 18, 20 that is connected to the first end of the hydraulic feathering actuator 3. During normal conditions, the hydraulic actuator 3 can move the arm 36 and, thereby, provide a pitching of the blade 48 by means of the proportional valve 10 controlled by a control system, for example in relation to the proportional valve 10. During normal conditions, the hydraulic fluid can be drained from the proportional valve 10 and fed into the first side of the hydraulic feathering actuator 3 by a drain line 24. This action will move the hydraulic feathering actuator piston 4 to the right. During this operation hydraulic fluid will be drained from the second side of the hydraulic feathering actuator 3 into the proportional valve 10 via drain line 32. Likewise a reverse operation of the piston can be achieved by the proportional valve during normal conditions.

During an emergency situation, in case of grid drop out and failure in generator or control system, the pitching of the blades is established by means of the emergency system. At the presence of an activation signal, which could the absence of electricity or the rotational speed exceeding a predetermined threshold value, for example observed by the control system, the emergency valves 23, 37, 31 open and the proportional valve 10 closed, or the pilot pressure steered valve 25 in line 24 closed. Accordingly, hydraulic fluid is drained out of the emergency accumulator 8 due to the stored mechanical energy in the emergency accumulator spring 14. The only way for the hydraulic fluid is then into the hydraulic feathering actuator 3 moving the hydraulic feathering actuator piston 4 and, hereby, driving the blade 46 into a feathering position. In the initial phase of the feathering process, the motion of the hydraulic feathering actuator piston 4 will drain hydraulic fluid out of the second end of the hydraulic feathering actuator 3 through drain line 33, 34, 38 into the first receiver accumulator 6 due to the relative relation between the flow resistance of the first receiving nozzle 43 and the second receiving nozzle 41 provided that the flow resistance is higher in the second receiving nozzle 41 than in the first receiving nozzle 43. When a certain amount of hydraulic fluid is fed into the first receiving accumulator 6, the first receiving accumulator piston is balanced by equal forces at each side of the piston 44. Hereafter, the hydraulic fluid drained from the hydraulic feathering actuator 3 can only flow through the drain line 26 connected to the second receiving accumulator 66.

It should be mentioned that that the spring 42 in receiving accumulator 6 is optional and may be omitted. Drain of the hydraulic fluid from the hydraulic feathering actuator 3 may in this case flow through the drain line 26 connected to the second receiving accumulator 66 when receiving accumulator is filled up. The second receiving accumulator may be equipped with a spring loaded actuator. However, this spring arrangement may also be omitted, and second receiving accumulator 66 may be a tank for receiving the drainage of the feathering actuator 3.

Alternatively or in addition to the flow restrictors 43, 41, it is possible to apply flow control valve 37, 31 that have a delay in the adjustment of the flow amount. By this way, the hydraulic fluid can initially be forced into the first receiving accumulator 6 when one valve 37 opens up. Hereafter the other valve 31 can be opened in order to provide for filling of the second receiving accumulator 66.

The hydraulic circuit, as described, can perform an emergency stop of the blade 46 by by-passing the proportional valve 10, which is hydraulically isolated during an emergency stop, for example by closing valves 25 and 25'. For example, the closing of valves 25, 25' and opening of valves 23, 37, 39 and 31 may be achieved by providing these valves as electrical valves or, alternatively, hydraulic valves requiring hydraulic pilot pressure to be open or closed respectively. In case of emergency, this pilot pressure may fail, resulting in passively proper closing and opening of the respective valves. The pitch speed during an emergency stop can be controlled in various ways; by using flow-control valves or nozzles and by placing these components on the input side, the output side or both sides of the pitch cylinder 3.

FIG. 2 illustrates a large wind turbine 50 with three wind turbine blades 48. The wind turbine comprises a wind turbine tower 46 a nacelle 54 and a turbine hub 52. Wind passing through the area swept by the blades 48 will enable the rotor to rotate in a plane perpendicular to the direction of the wind. These rotational movements can be used to generate electricity that can be supplied through the transmission grid.

Figure 3:
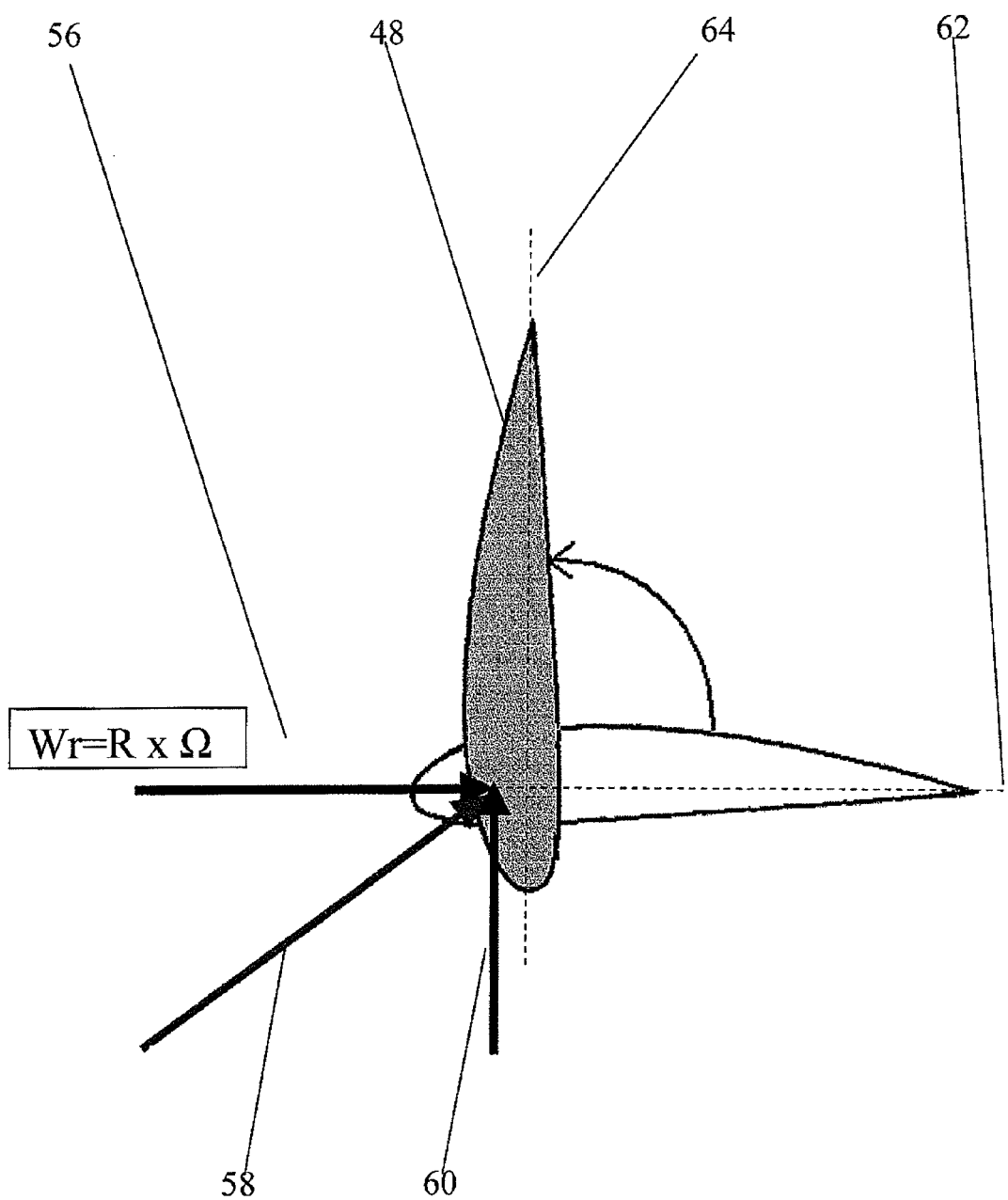
FIG. 3 illustrates schematically the forces involved during a pitching operation of a blade according to the present invention, FIG. 4 shown a block diagram of an alternative embodiment with weight loaded emergency accumulator.

FIG. 3 shows forces involved during a pitching operation of a blade according to the present invention. The blade 48 is pitched in a counter-clockwise direction in the figure from position 62 to position 64. The wind turbine blade 48 is from position 64 pitched out of the wind by a rotation about its longitudinal axis in order to reduce the load of the blade. The wind direction 60, the rotational speed 56 and $W_r$ 58 is indicated. The wind turbine blade 48 is pitched towards the feathered position from position 62 to position 64. The position 62 corresponds to any normal operation situation, in which the wind turbine blades 48 have been pitched into the wind in order to optimize the lifting forces on the blade to make the wind turbine rotor and shaft rotate.

The wind turbine blade 48 is under the influence of a lift force orthogonal to the wind direction and a drag force parallel to the direction of the wind 60. The sum of the lift force and the drag force determines to magnitude of the wind turbine blade 48 acceleration.

Figure 4:
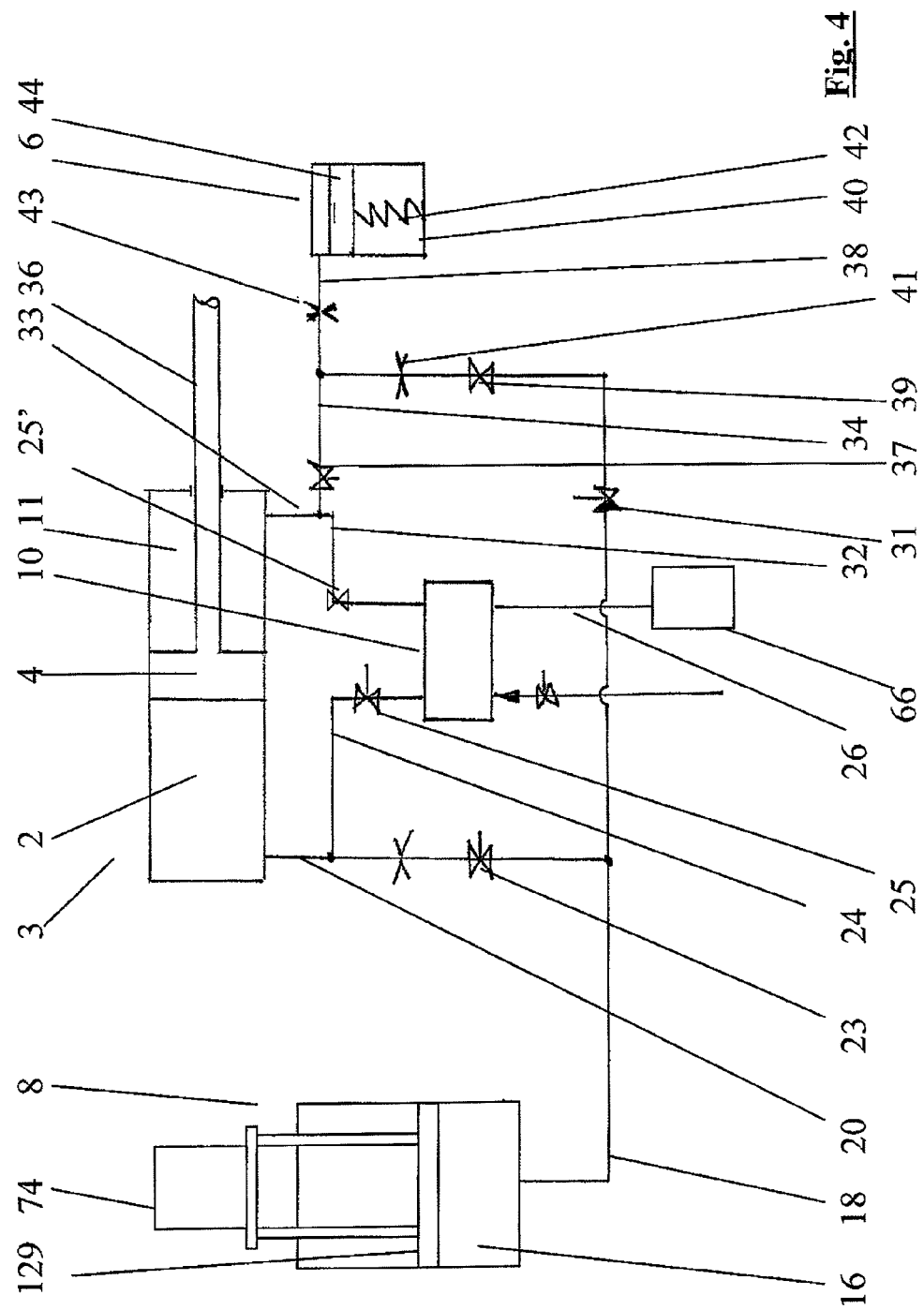

FIG. 4 shows a block diagram of the hydraulic circuit in a mechanical stop situation in an embodiment of a wind turbine blade pitch change and feather actuation system like the one presented in FIG. 1. The Emergency accumulator 8, however, has an emergency accumulator piston 129 that is loaded by a weight 74 instead of a spring. Alternatively, the spring may be substituted by a pressurised gas supply.

Figure 5:
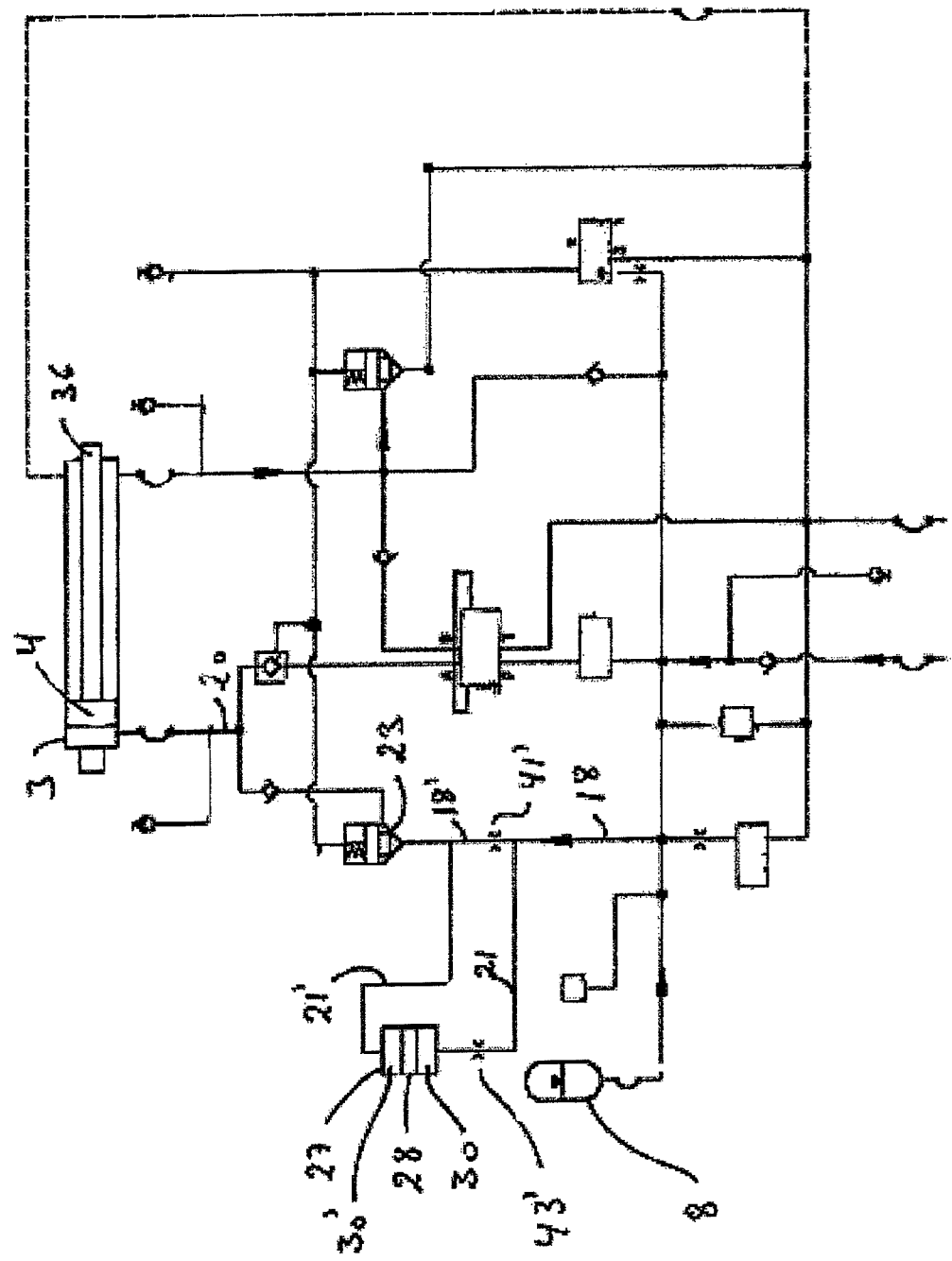
FIG. 5 illustrates a further embodiment with a speed regulation on the entrance side of the feather actuator.

Another alternative system is illustrated in FIG. 5. A loaded emergency accumulator 8, activated during emergency situations, is connected to the pitch cylinder 3 through valve 23 and line 20. Fluid from the emergency cylinder may pass through valve 23 and to the pitch cylinder 3 along two ways, where the first way is through line 18, line 21, flow restrictor 43', piston arrangement 27, and line 21', and where the second way is through line 18, flow restrictor 41' and line 18'. As flow restrictor 41' is more narrow than flow restrictor 43', flow primarily will pass through restrictor 43' in the beginning of the emergency pitch cycle. Piston arrangement 27 will receive fluid in the lower chamber 30 and push piston 28 upwards, which drains fluid from upper chamber 30' and causes the first, fast movement of the piston 4 in pitch cylinder 3. After complete fill-up of the lower chamber 30 and emptying of the upper chamber 30', no more fluid may pass the piston arrangement 27 and flow is only possible to the more restrictive passage in line 18, 18' causing a second, more slow movement of the feathering piston 4 in pitch cylinder 3.

Figure 6:
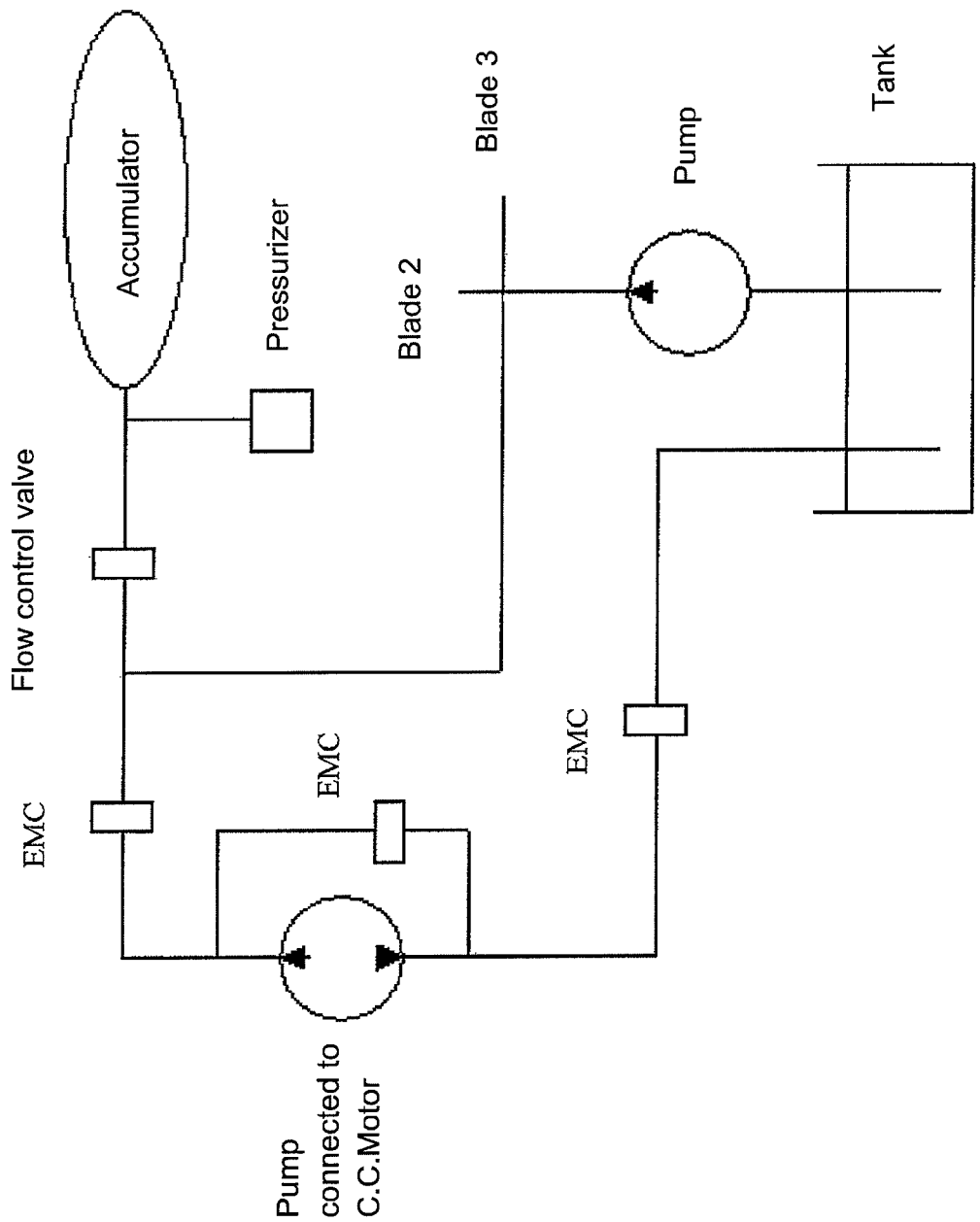
FIG. 6 is a scheme for a motor driven loading of the emergency accumulator.

An even further embodiment is sketched in FIG. 6. Under normal conditions, an electrical motor (AC or DC) with gearing is used to move the blades, like it is known from prior art solutions. However, this feedback controlled electrical system is combined with a feedback-free hydraulic emergency system. In this case, a motor pump is used on the one hand for filling the emergency accumulator and, on the other hand, for turning the blades in case of emergency, where the electrical system is still working. If the electrical system is no longer working, the combination of the valves and the stored energy in the hydraulic accumulator is used for driving the hydraulic fluid to the blades by a two step pitching action or by a pitch of more than two steps. Systems as derivable from FIG. 1, FIG. 4 and FIG. 5 can be used in this case.

The invention claimed is:

1. A system for driving a wind turbine blade (46) of a wind turbine rotor, the system having a first pitch driving system configured for adjusting the pitch of the blades during normal working conditions on the basis of a feedback signal from a pitch control system, wherein the system is configured to drive the blades with variable pitch velocity into a feathered position during an emergency stopping process, characterised in that, the system in addition to the first pitch driving system comprises a feedback-free, emergency pitch system for driving the blades into a feathered position.

2. A system according to claim 1, wherein the system is configured for a stepwise decreasing pitch velocity during emergency stopping.

3. A system according to claim 1, wherein the emergency pitch system comprises a hydraulic actuator (3) functionally connected to the blade (46) for changing the pitch of the blade (46) during movement of the hydraulic actuator (3) and an emergency accumulator (8) connected to the hydraulic actuator (3) for driving the hydraulic actuator (3) with fluid from the emergency accumulator (8), the emergency accumulator having stored the hydraulic fluid under pressure.

4. A system according to claim 3, wherein
the emergency accumulator (8) comprises a resilient member (14) for accumulating the fluid in the emergency accumulator (8) under resilient pressure, the resilient member (14) being configured for driving the fluid out of the emergency accumulator (8) due to the expansion or retraction of the resilient member (14) or
the emergency accumulator (8) comprising a weight member (74) upon the fluid in the emergency accumulator for accumulating the fluid under pressure, the weight member being configured for driving the fluid out of the emergency accumulator (8) due to the downwards movement of the weight member (74).

5. A system according to claim 3, wherein the system comprises a valve arrangement (23, 37, 31) for activation of the release of pressurised fluid from the emergency accumulator (8), wherein the valve arrangement is configured to activate the release of the fluid from the emergency accumulator (8) due to an activation signal, the activation signal indicating the speed of the turbine above a certain threshold value, wherein the activation signal is free from feedback from the control system for normal operation of the rotor.

6. A system according to claim 5, wherein the valve arrangement (23, 37, 31) comprises a spring loaded emergency valve (23) between the emergency accumulator (8) and the hydraulic actuator (3), wherein the emergency valve (23) is configured to be closed under normal turbine operation due to action of hydraulic pilot fluid pressure against the spring load.

7. A system according to claim 6, wherein the hydraulic pilot fluid pressure is controlled by a pilot valve that is preloaded by a spring, the spring action being releasable due to the activation signal.

8. A system according to claim 3, wherein the system comprises a valve arrangement for activation of the release of fluid from the emergency accumulator (8), wherein the valve arrangement (23, 37, 31) is configured to activate the release of the fluid from the emergency accumulator (8) due to an activation signal, wherein the activation signal is absence of electrical power to the valve arrangement (23, 37, 31).

9. A system according to claim 3, wherein the system comprises a fluid connection (18, 20) from the emergency accumulator (8) to one side of a piston (4) in the hydraulic actuator (3), a first fluid connection (33, 34) from the opposite side of the piston to a first receiver accumulator (6) for receiving hydraulic fluid with a first volume flow from the hydraulic actuator (3) during driving a wind turbine blade (46) into the feathered position, and a second fluid connection (26) from the opposite side of the piston (4) to a second receiver accumulator (66) for receiving hydraulic fluid with a second volume flow from the hydraulic actuator (3) during driving a wind turbine blade (46) into the feathered position, wherein the receiving capacity of the first receiver accumulator (6) is less than the volume capacity of the emergency accumulator (8) for decreasing pitch velocity during filling of the second receiver accumulator (66) after filling of the first receiver accumulator (6).

10. A system according to claim 9, wherein a flow restrictor (31) is provided in the second flow connection (26) for restricting the flow to the second receiver accumulator (66) relative to the flow to the first receiver accumulator (6).

11. A system according to claim 9, wherein the first receiver accumulator (6) comprises a resilient member (42) and an accumulator arrangement (44) for accumulating the fluid in the emergency accumulator (8) under resilient pressure, the accumulator arrangement (44) being configured for receiving fluid under decreasing volume flow due to the expansion or retraction of the resilient member (42) during filling of the first receiver accumulator (6).

12. A system according to claim 3, wherein the system comprises a fluid connection (18, 18', 21, 27, 21', 23, 20) from the emergency accumulator (8) to one side of a piston (4) in the hydraulic actuator (3), the fluid connection comprising a first branch (21, 43', 27, 21') and a second branch (41', 18'), the flow restriction in the first branch (21, 43', 27, 21') being smaller than the flow restriction in the second branch (41', 18') for achieving an initial flow primarily in the first branch and secondarily in the second branch.

13. A system according to claim 12, wherein the first branch (21, 43', 27, 21') comprises a piston arrangement (27) with an inlet chamber (30) and an outlet chamber (30') on either side of a movable piston (28), wherein the inlet chamber (30) is configured for receiving hydraulic fluid from the emergency accumulator (8) for piston movement towards the outlet chamber (30'), wherein the outlet chamber (30') is configured for delivering hydraulic fluid to the hydraulic actuator (3) by decreasing the volume of the outlet chamber (30') by the piston movement.

14. A system according to claim 3, wherein the hydraulic actuator (3) is configured for blade pitch regulation also under normal operating condition of the wind turbine blade (48).

15. A system according to claim 14, wherein the system comprises a proportional valve (10) for driving the hydraulic actuator (3) during normal condition, wherein the system comprises valves (25) configured to hydraulically bypass the proportional valve (10) under emergency conditions.

* * * * *